July 1, 1958
H. JEWELL
2,841,258
MAGNETIC CLUTCH
Filed March 4, 1955
2 Sheets-Sheet 1
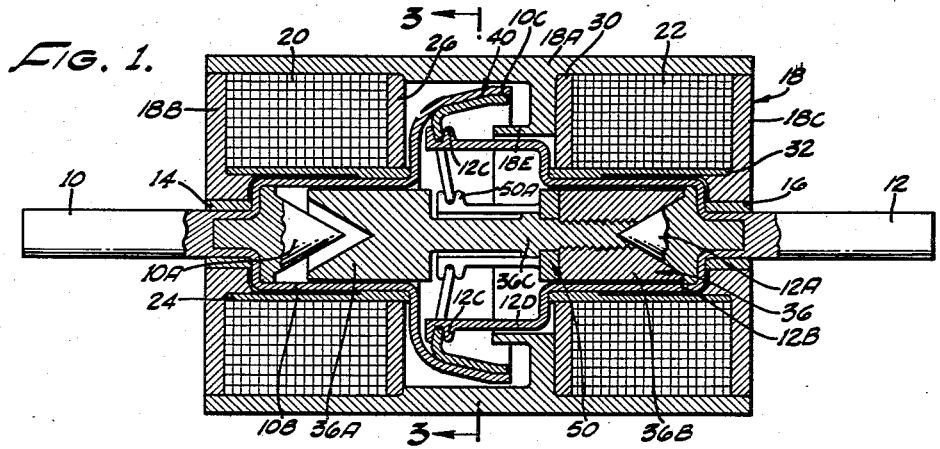
Fig. 1.
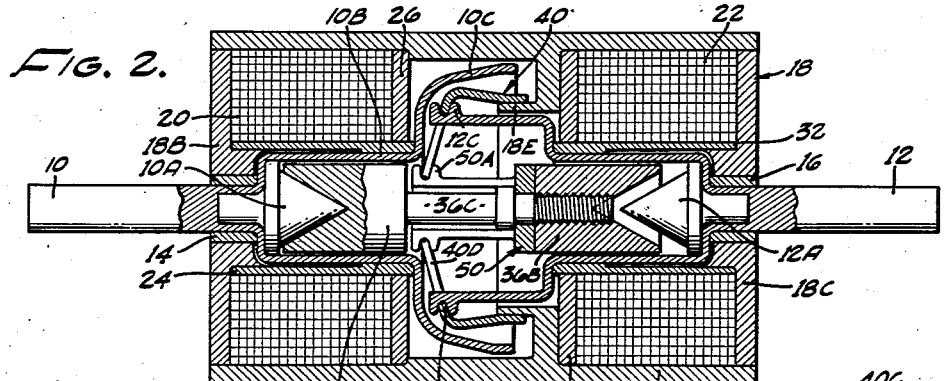
Fig. 2.
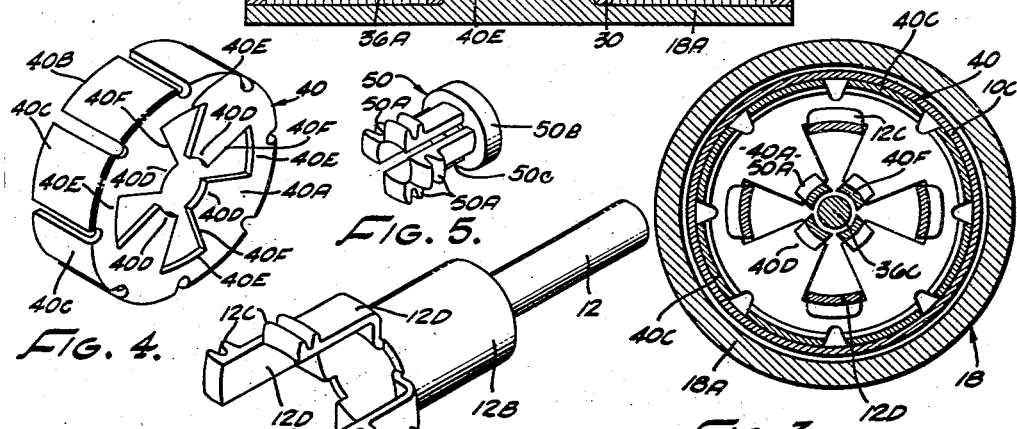
Fig. 4.
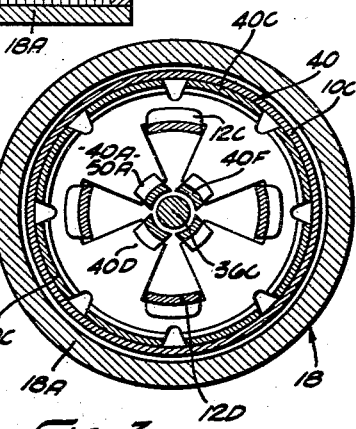
Fig. 5.
Fig. 3.
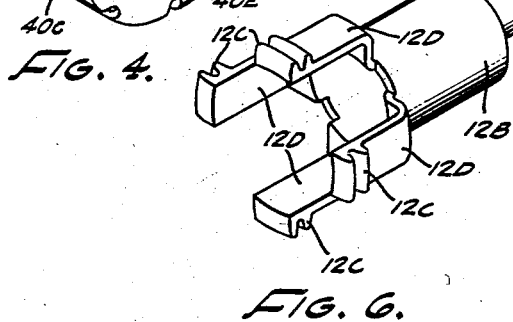
Fig. 6.
HOLLIS JEWELL
INVENTOR.
BY Lyon & Lyon
ATTORNEYS July 1, 1958  H. JEWELL  2,841,258
MAGNETIC CLUTCH
Filed March 4, 1955  2 Sheets-Sheet 2

HOLLIS JEWELL
INVENTOR.

BY *Lyon + Lyon*

ATTORNEYS

United States Patent Office 2,841,258
Patented July 1, 1958

2,841,258

MAGNETIC CLUTCH

Hollis Jewell, Los Angeles, Calif.

Application March 4, 1955, Serial No. 492,163

13 Claims. (Cl. 192—12)

The present invention relates to an improved device for coupling two rotatable shafts, and is especially useful in those installations wherein it is desired to control the movement of or to index the position of a shaft in accordance with electrical pulses.

In general, the device described herein is in the nature of a magnetic clutch for coupling together a pair of rotatable shafts which are journalled for rotation in a supporting structure, in accordance with electric pulses supplied to an associated electro-magnetic solenoid winding. The associated movable core has connected thereto what may be termed to be broadly as "over centered" spring means. Such spring means has two positions of stable equilibrium corresponding generally to an "on" condition and to an "off" condition so that such winding need not be continuously energized to maintain such "on" or "off" condition, as the case may be, but, on the contrary, such "on" or "off" condition, as desired, may be obtained by energizing the winding momentarily, as for example by a pulse of electric current.

It is therefore a general object of the present invention to provide an improved device of this character.

The specific object of the present invention is to provide an improved device of this character which may be made compact and inexpensive so that the same may be supplied and used in large quantity in present day computing apparatus, particularly of the type that is sensitive to pulses.

Another specific object of the present invention is to provide an improved device of this character in which the energizing current may be applied momentarily in the form of pulses to obtain an "on" or "off" condition, as desired.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a transverse sectional view through a magnetic clutch embodying features of the present invention, the clutch being shown in its engaged or "on" position;

Figure 2 is a sectional view as in Figure 1 but illustrates the elements of the clutch in their disengaged or "off" position;

Figure 3 is a sectional view taken generally on the line 3—3 of Figure 1;

Figures 4, 5 and 6 are each perspective views of different elements of the clutch which is illustrated in Figure 1;

Figure 7:
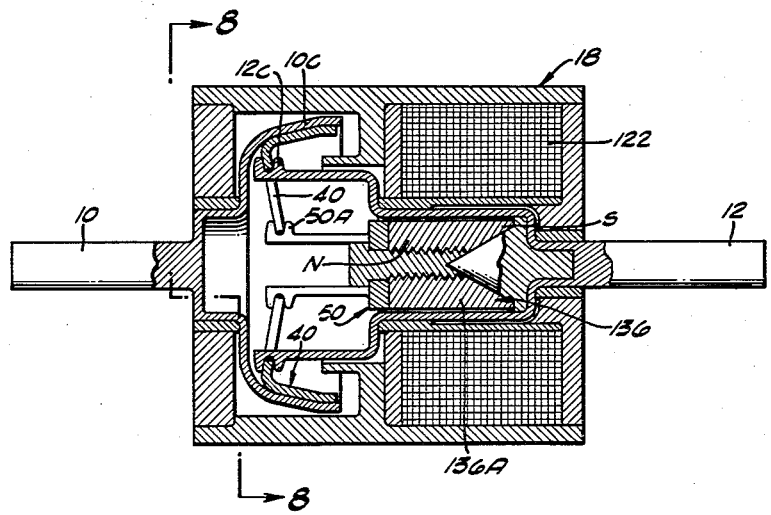
Figure 7 is a transverse sectional view through another form of magnetic clutch also embodying the features of the present invention.
Figure 8:
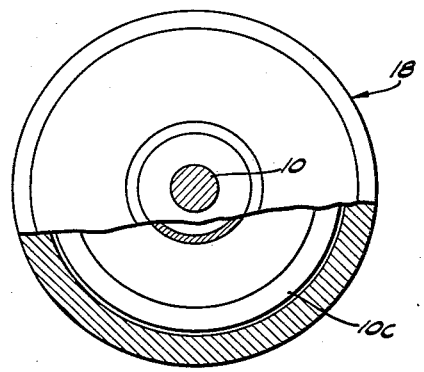
Figure 8 is a sectional view taken generally on the line 8—8 of Figure 7.

Referring to the preferred form of the invention illustrated in Figures 1–6, both inclusive, the magnetic clutch shown therein serves to couple the drive shaft 10 to the driven shaft 12. These two shafts are journalled for rotation on aligned axes in bearings 14 and 16, respectively, in the housing or stationary structure 18.

This housing 18 is generally in the form of a cylinder and serves to house the pair of cylindrically wound and aligned solenoid windings 20 and 22.

The housing 18 includes generally a cylindrical outer member 18A, a pair of spaced end rings 18B, 18C, all of magnetic flux carrying material. The aforementioned bearings 14 and 16 may be press-fitted in these end rings 18B and 18C, respectively.

The winding or coil 20 may be wound around the non-magnetizable sleeve 24 and may abut the inner ring 26 which may be of magnetizable material. This inner ring 26, as shown in Figure 1, abuts an internal shoulder of the cylindrical non-magnetizable member 18A, while the sleeve 24 may rest on the internally extending hub portion of the outer ring. This internal sleeve 24, since it is disposed adjacent an annular portion of the shaft 10, may also serve as a bearing for such shaft in conjunction with the aforementioned bearing 14.

The other coil or winding 22 may be assembled in like manner between the inner ring 30 and the sleeve 32 so as to provide a similar structure, both physical and magnetic.

These two coils 20 and 22 are each intended to act, at different times however, on the longitudinally movable core structure 36.

This core structure 36 includes, generally, a pair of spaced core members 36A and 36B which are each generally cylindrical and which are interconnected by the core portion 36C of reduced diameter. The core member 36A is intended to be acted on magnetically by the flux developed in coil 20 and the core member 36B is intended to be likewise acted upon by the flux developed in the coil 22.

The core member 36B, as shown in Figure 1, comprises an internally threaded member into which the core portion 36C is threaded. This particular assembly is desirable since it provides a means whereby a special form of compression spring 50 may be mounted on the core structure 36, as described hereinafter. Each of these two core members 36A and 36B is provided with conical shaped recess portions for cooperation respectively with the conical shaped ends 10A and 12A of shafts 10 and 12 which serve to guide the movement of the core member and to properly center the same magnetically. As shown, these core members 36A and 36B are each slideable respectively within the cylindrical extended portions 10B and 12B of the shafts 10 and 12.

The shaft 10 is thus extended not only to provide the cylindrical portion 10B but also provides an annular flanged or cup-shaped portion 10C which serves, as described in more detail hereinafter, as a clutch engaging element. This clutch engaging element 10C is engageable with a cooperating clutch engaging element 40 which is in the form of a cup-shaped member, apertured however as illustrated in Figure 4. This member 40 is resilient and is pivotally supported at different circumferentially spaced points thereon within the socket portions 12C which are each formed on the free ends of the shaft arms 12D.

This generally cup-shaped resilient member 40, as illustrated in Figure 4, has an apertured base portion 40A and a cylindrical portion 40B which is slit in the axial direction to provide eight resilient cantilever supported fingers 40C serving as the actual clutch engaging elements. The base 40A, as seen in Figure 4, has a centrally and cylindrically apertured portion defined by the four segments 40D. Likewise the base 40A has four radially apertured portions defined by the four segments of larger radius, namely the segments 40E. It is these segments 40E which are supported in the corresponding socket portions 12C of the shaft 12. The other segments 40D are similarly cradled in the socket portions 50A of the special compression spring 50 which is a sleeve-like element illustrated in Figure 5.

This compression spring 50 has a circular base 50B from which the four cantilever supported resilient arms 50C are integrally formed. The socket portions 50A are each on the end of a corresponding resilient arm 50C. The base portion 50B is sandwiched, as shown in Figure 1, between the core member 36B and an annular shoulder of the intermediate core portion 36C so that this special compression spring 50 is mounted on and moves with the core member 36, so as to move and to cause the resilient cup-shaped member 40 to be flexed in either one of its two positions of stable equilibrium illustrated respectively in Figures 1 and 2.

In other words, in accordance with one important feature of the present invention, it is not necessary that either one, or for that matter both, of the coils 20 and 22 be energized in order to maintain the clutch in its engaged position, illustrated in Figure 1, or to maintain the clutch in its disengaged position, illustrated in Figure 2. This is so because the resilient cup-shaped member 40 passes what may be termed to be an "over-center" position. The special compression spring 50, at all times, exerts an outward radial force against the segments 40D so as to cause the radially extending base arms 40F (which extend generally between the segment 40D on the one hand and the segment 40E on the other hand) to flex. Thus, in Figure 1 the socket portion 40A is to the right of the socket portion 12C and the spring tension which is developed serves to press the resilient fingers 40C into engagement with the other cooperating clutch member 10C. On the other hand, as shown in Figure 2, the socket portion 40A is to the left of the socket portion 12C and in such case the cup-shaped member 40, due to the resilient forces which are developed, tends to be rotated in the opposite direction, namely in the clockwise direction in Figure 2 within the saddle or socket portion 12C, but such clockwise movement is limited by engagement of the resilient fingers 40C with the inner annular flanged portion 18E of the housing 18. This flanged portion 18E thus serves as a stop.

Thus, in operation of the arrangement illustrated in Figures 1–6, when it is desired to disengage the clutch, the coil 20 is energized momentarily with for example a short pulse of current. This causes the core member 36A to be attracted and to cause the core member 36A to move from the position illustrated in Figure 1 to the position illustrated in Figure 2. Likewise, when it is desired to engage the clutch, the coil 22 is energized momentarily, in which case the core member 36B is attracted. When the core 36B is thus attracted, the core member moves to the right and the parts then assume the position illustrated in Figure 1 wherein they are held in a position of stable equilibrium, as described above.

In the arrangement illustrated in Figure 7, the same type of clutch elements are employed as in previous figures, but the core member 136 (corresponding to the core member 36 in Figure 1) is moved in opposite directions by a single coil 122 (corresponding to coil 22 in Figure 1) cooperating with the core structure 136 which, in this instance, includes also a permanent magnet 136A. Like elements in Figures 1 and 7 have identical reference numerals for purposes of simplification. Thus, the shaft 10 in Figure 7 has the same clutch engaging element 10C which cooperates, as described above, with the same resilient cup-shaped element 40. The element 40, as described above, is supported in the plurality of saddles or socket portions 12C on an extension of the shaft 12. Also, this cup-shaped member 40 is seated in the socket portions 50A of a like special compression spring 50 so as to function as described above in connection with Figure 1. In Figure 7 the core member 136A (which corresponds to the core member 36B) is a permanent magnet which has for example a north pole as indicated by the letter N at the left-hand end thereof and a south pole as indicated by the letter S at the right hand end thereof. The clutch, as illustrated in Figure 7, is shown in its engaged position and is maintained in such engaged position independently of any current which may flow in the coil 122. Operation of this clutch involves a reversal of the current flow through the coil 122, and such current flow may be in the form of momentary short pulses of different polarity. When the current is of one polarity, the permanent magnet 136A is attracted to a position inside the coil 122; but when the current through the coil 122 is of the opposite polarity, the permanent magnet 136A is repelled, and in such case the core member 136 is moved to the left to a position wherein the clutch elements move to a clutch disengaging position illustrated in Figure 2.

While the device described above forms the general function of a combined clutch and brake, the same may be used as a clutch solely or as brake soley.

In this respect, it is noted that a braking action becomes effective when the clutch element 40 engages the annular shoulder 18E, as illustrated in Figure 2. In another form, the shoulder 18E is omitted, in which case the device operates solely as a clutch. When the device is used as a brake, the shaft 10 may either be omitted or left unconnected.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a device of the character described, a structure having a pair of aligned bearings, a first shaft rotatably supported in one of said bearings, a second shaft rotatably supported in the other one of said bearings, a magnetic core in said structure, spring means connected to said core and having two positions of stable equilibrium for interconnecting said first and second shafts, and electromagnetic means magnetically associated with said core for moving said spring means from one of said positions to the other of said two positions.

2. An arrangement as set forth in claim 1 in which said electromagnetic means comprises a pair of solenoid windings, each magnetically associated with said core to move the same in opposite directions.

3. An arrangement as set forth in claim 1 in which said electromagnetic means comprises a single solenoid winding mounted on said structure, said core having a permanent magnet mounted thereon, and means for reversing the current through said winding so as to cause movement of said core in opposite directions.

4. An arrangement as set forth in claim 1 in which said spring means comprises a sleeve-like element having a plurality of cantilever supported leaf springs, said element being mounted on said core, a resilient cup-shaped element having its circular wall slit to form a plurality of resilient fingers, means connecting said cup-shaped element to one of said shafts, said cup-shaped element being centrally apertured, with the apertured portion thereof being mounted on the free ends of said leaf springs, and an annular member carried by said other one of said shafts and engageable by said resilient fingers upon energization of said electromagnetic means.

5. In a device of the character described, a structure, a pair of rotatable shafts journalled for rotation in said structure, a clutch for interconnecting said pair of shafts, said clutch comprising overcentered spring means having two positions of stable equilibrium, electromagnetic means including a core for moving said spring means from one of its positions of stable equilibrium to the other one of its positions of stable equilibrium, said spring means comprising a generally cup-shaped resilient member on one of said shafts and heaving an apertured base and a cylindrical wall which is slit to provide a plurality of resilient fingers, a sleeve-like member, said sleeve-like member having a base portion and having its cylindrical wall slit to form a plurality of resilient cantilever supported arms, each one of said arms being provided with a socket portion which is engageable with said apertured base, and an annular member engageable with said resilient fingers.

6. An arrangement as set forth in claim 1 in which said electro-magnetic means comprises a solenoid winding magnetically associated with said core, said one of said shafts having means thereon for pivotally supporting said cup-shaped member.

7. In a device of the character described, a structure having a pair of aligned shafts, clutch means for interconnecting said shafts, said clutch means comprising a core member, electromagnetic means magnetically associated with said core member for moving the same upon energization of such means first resilient means mounted on said core member, second resilient means pivotally mounted on one of said shafts and engageable with said first resilient means, and an element mounted on the other one of said pair of shafts and engageable with said second resilient means, said first and second resilient means comprising over centered resilient means having two positions of stable equilibrium, and at least one winding for moving said core member.

8. In a device of the character described, a structure, a pair of aligned shafts journalled for rotation in said structure, a member movable in said structure, a sleeve-like element having a base portion mounted on said member and having a plurality of resilient cantilever supported fingers forming the cylindrical portion of said sleeve-like element, said fingers each being formed with a socket portion, first clutch means engageable with each of said socket portions and pressed generally radially outwardly by said fingers, said first clutch means being mounted on one of said shafts, and second clutch means mounted on the other one of said pair of shafts and engageable with said first clutch means.

9. An arrangement as set forth in claim 8 in which said first clutch means comprises a generally cup-shaped element having an apertured base portion engageable with each of said socket portions.

10. An arrangement as set forth in claim 8 in which said first clutch means comprises an apertured flat spring having the apertured portion thereof engageable with each of said socket portions.

11. An arrangement as set forth in claim 8 in which said first clutch means comprises an apertured flat spring having its apertured portion engageable with each of said socket portions, a first generally annular disc attached to said flat spring, and said second clutch means comprises a second generally annular disc engageable with said first annular disc.

12. An arrangement as set forth in claim 8 in which said first clutch means comprises a plurality of individually mounted spring members on said one shaft and engageable with a corresponding socket portion.

13. A combination clutch and brake including a pair of aligned shafts journalled for rotation, a structure mounting said shafts for rotation, a member movable in said structure, a sleeve-like element having a base portion mounted on said member and having resilient means forming the cylindrical portion of said sleeve-like element, said resilient means each being formed with a socket portion, first clutch means engageable with each of said socket portions and pressed generally radially outwardly with said resilient means, said first clutch means being mounted on one of said shafts, second clutch means mounted on the other one of said shafts and engageable with said first clutch means, and said first clutch means being engageable with a stationary position of said structure.

References Cited in the file of this patent

UNITED STATES PATENTS

| | | |
|---|---|---|
| 2,268,509 | Kraft | Dec. 30, 1941 |
| 2,315,298 | Thompson | Mar. 30, 1943 |
| 2,535,046 | Curry | Dec. 26, 1950 |